United States Patent Office 3,128,255
Patented Apr. 7, 1964

3,128,255
EPOXIDE COMPOSITIONS
Charles W. McGary, Jr., and Charles T. Patrick, Jr., South Charleston, W. Va., assignors to Union Carbide Corporation, a corporation of New York
No Drawing. Filed Nov. 24, 1958, Ser. No. 775,727
27 Claims. (Cl. 260—2)

This invention relates to compositions comprising curable compositions, partially cured compositions, and cured resinous compositions. In a particular aspect, this invention relates to polyfunctional amine-spirobi(meta-dioxane) epoxide compositions which are useful as adhesives, protective coatings, laminates, films and the like, and to processes for their preparation.

This application is a continuation-in-part of co-pending application Serial No. 747,581, entitled "Epoxide Compositions," by Charles W. McGary, Jr. and Charles T. Patrick, Jr., filed July 10, 1958, and assigned to the same assignee as the instant application.

The resinous compositions of this invention can be obtained as hard, tough, solid resins, semi-solid resins and viscous liquid resins. The solid resins can be made as infusible materials with high heat distortion values capable of supporting loads at temperatures up to 150° C. and above. Resins are also obtainable by this invention which have high room temperature flexural strengths and high room temperature compressive strengths. Moreover, such resins have high flexural strengths at elevated temperatures. These resins are suitable for a variety of applications, wherein strength and load carrying capabilities at elevated temperatures are required in addition to hardness and toughness. The solid resins can also be made with high degrees of hardness and are particularly valuable as durable, wear-resistant and scratch-resistant materials. They can be made as transparent solids, colored solids, and as solids which are capable of being machined and polished. Insolubility in most organic solvents is another property that is characteristic of the high molecular weight resins of this invention.

The resins which are partially cured semi-solid and viscous liquids can be made so as to contain reactive epoxy groups or reactive amino hydrogens. The epoxy-containing resins are reactive with active hydrogen compounds, such as polyhydric alcohols and polyfunctional amines, and other compounds such as polycarboxylic acid and polycarboxylic acid anhydrides. These resins are useful, for example, in coating formulations and are advantageous in that tack-free films can be formed and cured rapidly by heating. Amino-hydrogen-containing resins of this invention are capable of reacting with epoxides and polyepoxides in forming valuable resins.

The properties of the resins of this invention can be varied by the incorporation of various modifiers such as the addition products of formaldehyde with phenols, amines and urea. Polyepoxides, such as the polyglycidyl ethers of polyhydric alcohols and phenols, butadiene dioxide, soybean oil epoxide, 3,4-epoxycyclohexylmethyl 3,4 - epoxycyclohexanecarboxylate, bis(2,3 - epoxycyclopentyl)ether, vinylcyclohexene dioxide, and the like, may also be used as modifiers for the resins.

The curable compositions of this invention comprise mixtures of a polyfunctional amine and a spirobi(meta-dioxane) derivative having an epoxide-containing group substituted in the three-position and in the nine-position. The epoxy-containing substituent can contain nitrogen, silicon, phosphorus, sulfur, halogen and the like, in addition to carbon, hydrogen and oxygen. Besides at least one epoxide group in each substituent, other groups can be present such as ether, ester, amide, imide, nitrile, phosphoric acid ester and sulfuric acid ester groups, and the like.

By the term "polyfunctional amine" as used herein is meant an amine having at least two active amino hydrogen atoms which can be on the same nitrogen or on different nitrogen atoms.

The preferred curable polyfunctional amine-spirobi(meta-dioxane) epoxide systems of this invention can be expressed as compositions comprising a polyfunctional amine and a spirobi(meta-dioxane) epoxide derivative corresponding to the general formula:

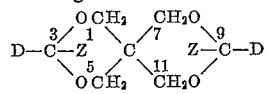

wherein each substituent D is composed of from two to eighteen carbon atoms, one oxygen atom and hydrogen, and wherein any carbocyclic nucleus incorporated in said D is three to six carbon atoms in size, and said oxygen atom is attached to vicinal carbon atoms; and Z is taken from the group consisting of hydrogen and lower alkyl containing between one and four carbon atoms.

By "carbocyclic nucleus" as used herein is meant a ring structure composed of carbon atoms, such as cyclopropyl, cyclopentyl, cyclohexyl, phenylene, and the like.

Due to the varying functionality of the amines in the compositions, the suitable proportions of polyfunctional amine to spirobi(meta-dioxane) epoxide derivative are best defined in terms of amino hydrogen atoms per epoxide group. Resinous products can be obtained from mixtures of polyfunctional amines and spirobi(meta-dioxane) epoxide derivatives having proportions ranging from about 0.2 to 4.0 amino hydrogen atoms of amine per one epoxide group of the spirobi(meta-dioxane) derivative. Solid resins that are particularly valuable from the standpoint of their outstanding properties of hardness, toughness, infusibility, high heat distortion values and insolubility in most organic solvents can be obtained by curing mixtures of polyfunctional amines and spirobi(meta-dioxane) epoxide derivatives in relative proportions providing about 0.4 to 2 amino hydrogens of the amine for each epoxide group of the spirobi(meta-dioxane) derivative.

Spirobi(meta-dioxane) epoxide derivatives can be synthesized readily by the epoxidation of the corresponding 3,9-olefinically unsaturated spirobi(meta-dioxane) compounds. For example,

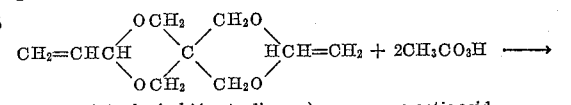

3,9-divinylspirobi(meta-dioxane)    peracetic acid

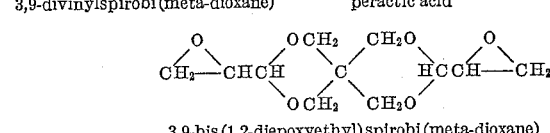

3,9-bis(1,2-diepoxyethyl)spirobi(meta-dioxane)

A wide variety of spirobi(meta-dioxane) epoxide derivatives can be employed in the compositions of this invention. One group of these materials can be described by Formula A:

(A)
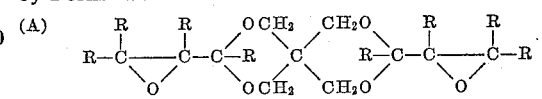

wherein R is hydrogen or lower alkyl groups containing from one to four carbon atoms. Preferred compounds representative of this group include those which have only methyl or ethyl substituents (1) on the epoxide groups, or have no substituents at all (2):

(1)
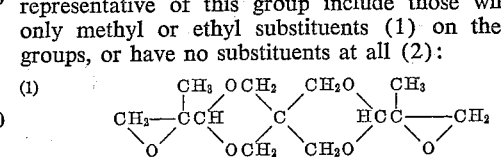

(2)
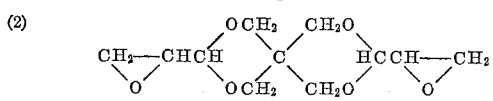

Another group of spirobi(meta-dioxane) epoxide derivatives can be described by Formula B:

(B)
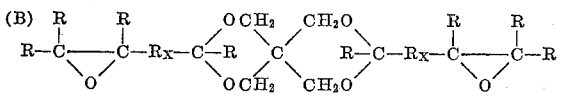

wherein R is hydrogen or lower alkyl groups containing from one to four carbon atoms, and $R_x$ is an alkylene group containing from one to sixteen carbon atoms. Preferred compounds representative of this group include those which are unsubstituted (3), or have one or two lower alkyl substituents (4):

(3)
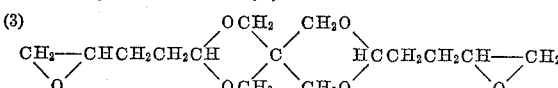

(4)
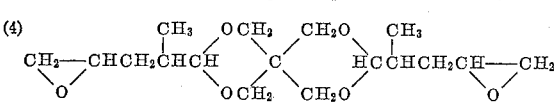

Another group of spirobi(meta-dioxane) epoxide derivatives can be described by Formula C:

(C)
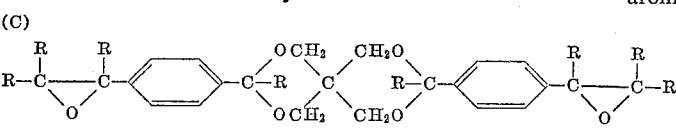

wherein R is hydrogen or lower alkyl groups containing from one to four carbon atoms. Representative of this group of compounds is 3,9-bis(p-epoxyethylphenyl)spirobi(meta-dioxane).

Another group of spirobi(meta-dioxane) epoxide derivatives can be described by Formula D:

(D)
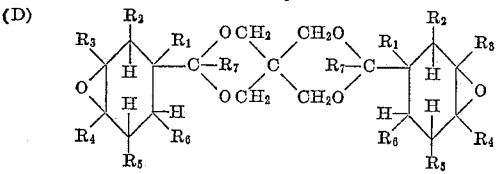

wherein $R_1$ through $R_7$ are taken from the group consisting of hydrogen and lower alkyl containing from one to four carbon atoms, the total number of carbon atoms in $R_1$ through $R_6$ not exceeding twelve on each ring. Preferred compounds representative of this group include those which are unsubstituted (5), or have one or two lower alkyl substituents (6):

(5)
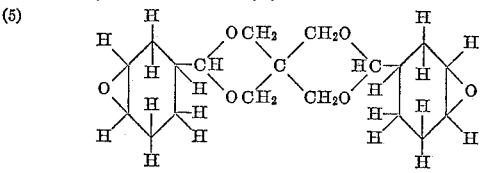

(6)
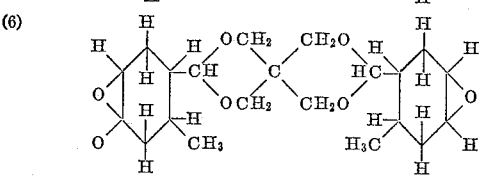

It is not necessary that the epoxy substituent in the three-position be the same as that in the nine-position. Spirobi(meta-dioxane) epoxide derivatives that have dissimilar three- and nine-substituents are as convenient to synthesize as those which have similar substituents.

The 3,9-olefinically unsaturated spirobi(meta-dioxane) derivatives which can be epoxidized to practice the starting materials of this invention are conveniently synthesized by the condensation of unsaturated aldehydes and ketones or mixtures thereof with pentaerythritol. A more detailed description of the production of these 3,9-olefinically unsaturated spirobi(meta-dioxane) compounds, and the epoxidation products thereof which are novel in the art, may be found described in co-pending application Serial No. 747,585 by H. R. Guest et al., entitled "Diepoxides of Bicyclic Acetals," filed July 10, 1958. Suitable epoxidizing reagents include peracetic acid, acetaldehyde monoperacetate, perbenzoic acid, monoperphthalic acid, pertrichloroacetic acid, and the like. Peracetic acid is the preferred oxidizing agent because it is economically prepared in high purity and it reacts smoothly to give high yields of epoxides. The epoxidation reactions are preferably conducted by slowly adding a solution of peracid in an inert solvent such as ethyl acetate, ether or acetone, to the unsaturated spirobi(meta-dioxane) compound at a reaction temperature between 0° C. and 150° C.

The polyfunctional amines that can be combined with spirobi(meta-dioxane) epoxide derivatives in the compositions of this invention are typified by aliphatic amines, such as ethylamine, isopropylamine, n-butylamine, isobutylamine, 2-ethylhexylamine, monoethanolamine, monoisopropanolamine, and the like; amides, such as formamide, acetamide, propionamide, n-butyroamide, stearamides, hexahydrobenzamide, and the like; aromatic primary amines, such as aniline, para-methyl-benzylamine and the like; heterocyclic primary amines, such as N-(aminoethyl)morpholine, N-(aminopropyl)morpholine and the like; aliphatic polyamines, such as ethylenediamine, propylenediamines, butylenediamines, pentylenediamines, hexylenediamines, octylenediamines, nonylenediamines, decylenediamines, dimethylurea, 1,3-diamino-2-propanol, 3,3'-iminobispropylamine, guanidine and the like; aromatic polyamines, such as meta-, ortho- and para-phenylenediamines, 1,4-naphthalenediamine, 1,4-anthradiamine, 3,3'-biphenyldiamine, 3,4-biphenyldiamine, 3,4-toluenediamine, meta-xylylenediamine, para,para'-methylenedianiline, 1-methoxy-6-methyl-metaphenylenediamine, para,para'-sulfonyldiamine and the like; heterocyclic polyamines, such as piperazine, 2,5-dimethylpiperazine, melamine, 2,4-diamine-5-(aminomethyl) pyrimidine, 2,4,6-triaminopyrimidine, 3,9-bis-(aminoethyl)spirobi(meta-dioxane); the polyalkylene polyamines, in particular, the polyethylene polyamines and polypropylene polyamines such as diethylenetriamine, triethylenetetramine, tetraethylenepentamine, dipropylenetriamine and the like.

Other useful polyfunctional amines include the low molecular weight polyamides which are condensation products of polycarboxylic acids, in particular, hydrocarbon dicarboxylic acids, with polyamines, particularly diamines, such as those monomeric diamines previously listed. Typical polyamides can be prepared in accordance with known condensation procedures from adipic acid and hexamethylenediamine, dilinoleic acid and ethylenediamine, terephthalic acid and diethylenetriamine and the like.

Still other illustrations of polyfunctional amines are the addition products of polyamines, in particular, diamines and triamines, and lower molecular weight epoxides containing oxirane oxygen linked to vicinal carbon atoms, such as ethylene oxide, propylene oxide, butadiene dioxide, diglycidyl ether, epoxidized soybean oil, epoxidized safflower oil and the like, and polyglycidyl polyethers, such as those prepared from polyhydric phenols and epichlorohydrin. Particularly useful polyfunctional amines are the mono- and poly-hydroxyalkyl polyalkylene polyamines which can be prepared by the addition reaction of polyalkylene polyamines, preferably ethylene-

diamine, propylenediamine, diethylenetriamine, dipropylenetriamine or triethylenetetramine and the like, with ethylene oxide or propylene oxide. The amines so produced include N-hydroxyethylethylenediamine, N,N'-bis(hydroxyethyl)ethylenediamine, N - bis(hydroxyethyl)diethylenetriamine, N,N' - bis(hydroxyethyl)diethylenetriamine, N,N'' - bis(hydroxyethyl)diethylenetriamine, N - hydroxypropyldiethylenetriamine, N,N - bis-(hydroxypropyl)diethylenetriamine, N,N'' - bis - (hydroxypropyl)diethylenetriamine, N - hydroxyethylpropylenediamine, N - hydroxypropylpropylenediamine, N - hydroxyethyldipropylenetriamine, N,N - bis(hydroxyethyl)dipropylenetriamine, N,N' - bis(hydroxyethyl)dipropylenetriamine, tris(hydroxyethyl)triethylenetetramine and the like.

These above-mentioned compounds are readily prepared in a known manner by reacting an epoxide with the aforesaid amines under pressure at temperatures in the range between 50° C. and boiling in the absence of solvents or in the presence of water or an alcohol. However, the reaction may be advantageously carried out without pressure, at temperatures below 40° C., and preferably below 35° C. Other polyfunctional amines can be prepared with known procedures by the addition reaction of polyglycidyl polyethers of dihydric phenols and polyamines, in particular, polyalkylene polyamines. Of particular importance in forming these epoxide polyamine adducts are the diglycidyl diethers of dihydric phenols, such as, for example, the homologues of dihydroxydiphenylmethanes singularly or mixed and the dihydroxydiphenyldimethylmethanes singularly or mixed. Mixtures of diglycidyl diethers of dihydric phenols can be prepared by reacting epichlorohydrin with a dihydric phenol using a molar excess of epichlorohydrin over the theoretical molar requirement. Substantially pure cuts of the diglycidyl diethers then can be obtained by fractional distillation under reduced pressure. Illustratively, the polyfunctional amine, i.e., the epoxide polyamide adduct itself, can be prepared by mixing the diglycidyl polyether of a dihydric phenol with a polyalkylene diamine such as diethylenetriamine, dipropylenetriamine, and the like, bringing to an elevated temperature, for example, up to about 200° C., and maintaining at such an elevated temperature for a period of from four to five hours. Alternatively, as an illustration, polyfunctional amines can be prepared by adding a diglycidyl diether of a dihydric phenol to a polyalkylene polyamine over a period of time, around three to four hours, while maintaining the reaction mixture at an elevated temperature, for example, up to about 200° C. and subsequently adding a dihydric phenol.

Additional polyfunctional amines include the low molecular weight addition products of a polyamine, preferably a polyalkylenepolyamine such as those listed above, and a vinyl group-containing compound. Typical vinyl group-containing compounds are ethylene, propylene, 1-butene, isobutene, acrolein, vinyl chloride, vinyl acetate, acrylonitrile, styrene and the like. These polyfunctional amines can be prepared in accordance with known procedures by reacting a polyamine and a vinyl group-containing compound in various proportions at a temperature in the range from 20° C. to 100° C. and removing unreacted materials and low boiling materials by vacuum distillation.

Other polyfunctional amines having a total of at least two active amino hydrogen atoms to the molecule can be advantageously employed in the epoxide compositions of this invention. For example, such polyfunctional amines as mixtures of para,para'-methylenedianiline and meta-phenylenedianiline, or other mixtures of two or more polyfunctional amines, can be used.

The curable compositions of this invention are produced simply by mixing together at room temperature or higher temperatures a polyfunctional amine and a spirobi(meta-dioxane) derivative having an epoxide-containing group substituted in the three-position and in the nine-position. It is usually not necessary to heat to high temperatures and to use solvents in order to obtain a homogeneous mixture of the amine and spirobi(meta-dioxane) epoxide derivative, although such measures can be employed. These mixtures can be kept for long periods up to a week or longer at room temperature or below with substantially no increase in viscosity, thus making such mixtures particularly suited for application wherein a long pot-life is desired. The curable compositions which are solid mixtures are particularly useful as molding powders. These solid compositions are mixtures of crystalline spirobi(meta-dioxane) epoxide derivatives and crystalline amine hardeners, and have outstanding "shelf-lives" at room temperature.

The partially cured and cured resinous compositions of this invention are produced from the curable compositions by the application of heat. The polymerization reactions involved proceed smoothly at elevated temperatures without the use of catalysts to produce polymers from the corresponding curable compositions. Catalysts such as metal halide Lewis acids, boron trifluoride, boron trifluoride complexes, phenols and alcohols may be used if desired in quantities up to 5.0 percent by weight or higher, based on the composition weight. The curing reactions may be conducted at temperatures between about 20° C. and 250° C., with a preferred temperature range being between about 25° C. and 200° C. Temperatures higher than 250° C. can be used although some discoloration of the resin product may result. The time for effecting the complete cure can be made to vary from a few minutes to several hours depending on the selection of curing temperature. A high curing temperature will provide a resinuous composition in less time than a low curing temperature. It is advantageous sometimes to heat the curable composition at a temperature within the range between 50° C. and 150° C. to first partially cure the composition until a viscous polymer or soft gel is formed, then allow the composition to cool. The resulting resinous materials may be dissolved in a suitable solvent and applied as a surface coating or may be otherwise manipulated. A temperature from 100° C. to 200° C. then can be used to complete the cure. However, any one or combination of two or more temperatures within the range of 25° C. and 250° C. can be employed if desired to effect the cure.

While not wishing to be held to any particular theory or mechanics of reaction, it is believed that in the curing process one epoxide group of a spirobi(meta-dioxane) epoxide derivative reacts with a maximum of one amino hydrogen of a polyfunctional amine molecule with the formation of a hydroxyl group attached to the spirobi(meta-dioxane) derivative and a carbon to nitrogen to carbon linkage connecting the spirobi(meta-dioxane) and amine residues. It is believed that a polyfunctional amine having more than two amino hydrogens to the molecule crosslinks through carbon to nitrogen to carbon linkages. Also, a degree of etherification occurs from intermolecular reactions of two or more epoxy groups with each other, and from intermolecular reactions of an epoxy group with a hydroxyl group.

The resinous compositions of this invention can be regarded as mixtures of polymeric molecules characterized by the presence therein of interconnecting units comprising polyvalent polyfunctional amine residues and tetravalent spirobi(meta-dioxane) groups. Each of the interconnecting spirobi(meta-dioxane) groups in the resinous composition has a divalent hydrocarbyl substituent containing between two and eighteen carbon atoms in the three-position and in the nine-position, and a second substituent in said three-position and in said nine-position selected from hydrogen and lower alkyl groups containing between one and four carbon atoms. In said divalent hydrocarbyl substituents, the two valences are located on vicinal carbon atoms. One valence of a given divalent hydrocarbyl substituent is attached to an amino nitrogen of one of the polyvalent amine residues, and the other valence of said given divalent hydrocarbyl substituent is attached to a hydroxyl group or to a derivative of a hydroxyl group, such as an alkoxyl group (—OR) or an acyloxy group (—OCOR) wherein R is a hydrocarbyl group. The hydroxyl derivative can be other than an ether group if during the curing reaction the hydroxyl group, which is formed at one of the valence atoms in a divalent hydrocarbyl substituent in the polymerization process, reacts with a group other than an epoxide group or another hydroxyl group. This other group may be contained in a modifier compound.

The above postulated reaction mechanisms, and the chemical structures of the presently described resins, are merely theoretical. Other theories or reasons may equally well explain the true chemical transformations and product structures involved.

As mentioned previously, it is sometimes desirable to prepare partially reacted curable composition from the polymerizable compositions of this invention by heating the spirobi(meta-dioxane) diepoxide and polyfunctional amine until a viscous polymer or a soft gel is formed and allowing the composition to cool. The resulting resinous material can be dissolved in a suitable solvent, such as xylene or methylisobutyl ketone, and applied as a surface coating with a subsequent heat cure to obtain the optimum properties. These partially reacted compositions may also be granulated or powdered and on further heating can be converted to infusible, insoluble products in molding and casting operations, with or without the addition of other ingredients, such as fillers, e.g., talc, wood flour, alpha cellulose and the like, and such as pigments, e.g., titanium dioxide, antimony oxide, zinc oxide, carbon black and the like.

The solid resins of this invention which have high heat distortion values are useful in industrial applications wherein load carrying capabilities at high temperature is required in addition to hardness and toughness. Such applications include hot fluid carrying conduits, high temperature electrical insulation (e.g., in high-speed aircraft and guided missiles), tools, dies and molds used at high temperature, and various laminates, molded articles, adhesives and surface coatings which are subject to high temperature uses.

A further use of some of the resinous compositions of this invention is in the field of adhesives. These compositions, when cured, adhere tenaciously to many types of materials such as wood, cloth, metal, glass, paper and the like. In this respect, they are particularly useful in manufacturing laminates of the above materials.

The curable compositions of this invention can contain other polyfunctional compounds besides amines which are reactive with epoxy groups. For example, polyols or compounds containing more than one aliphatic or phenolic hydroxyl group can be added to the curable compositions, and valuable resins can be obtained therefrom.

The following description will serve to illustrate particular embodiments of this invention. The resins described in the examples were prepared in three types of containers: (1) test tubes, (2) aluminum weighing dishes (about 2.5 inches in diameter and about 0.75 inch deep) and (3) aluminum "boat" molds (about 5.5 x 0.75 x 0.75 inches in dimension). The large resin samples were machined to 5 x 0.05 x 0.25 inches in dimension for physical property determinations which were the following ASTM methods:

| | ASTM method |
|---|---|
| Heat distortion point, 264 p.s.i., °C | D–648–45T |
| Izod impact, ft.lbs./in. of notch | D–256–47T |

Barcol hardness determinations were made with a Barcol Impressor GYZJ–934–1.

EXAMPLES 1 THROUGH 4

A quantity of 3,9-bis(1,2-epoxy-1-methylethyl)-spirobi-(meta-dioxane) (1.36 grams) was mixed with various molar proportions of p,p'-methylenedianiline as indicated in Table I. The resulting mixtures were heated until they were homogeneous and then they were maintained at a temperature of 80° C. for one and one-half hours, during which time gels were formed. After a postcure of one hour at a temperature of 120° C. plus six hours at a temperature of 160° C. the corresponding resins were cooled to room temperature and examined.

Table I

| Ex. No. | Amine, Grams | Equivalent Ratio [1] | Gel Time at 80° C., Minutes | Resin Description |
|---|---|---|---|---|
| 1 | 0.38 | 0.75 | 95 | Yellow, Barcol, 52. |
| 2 | 0.50 | 1.0 | 90 | Yellow, Barcol, 50. |
| 3 | 0.63 | 1.25 | 45 | Amber, tough, Barcol, 46. |
| 4 | 0.75 | 1.5 | 25 | Amber, tough, Barcol, 42. |

[1] Expressed as equivalents of amino-hydrogen groups per epoxy groups.

EXAMPLES 5 THROUGH 7

Quantities of 3,9-bis(1,2-epoxy-1-methylethyl)spirobi-(meta-dioxane) and p,p'-methylenedianiline were mixed in various proportions as indicated in Table II. The mixtures were heated until homogeneous, then they were maintained at a temperature of 80° C. for forty-five minutes plus one hour at a temperature of 100° C. plus four hours at a temperature of 120° C. and six hours at 160° C. Gels were obtained in each case after about forty-five minutes at a temperature of 100° C. The physical properties of the amber colored resins are recorded in Table II.

Table II

| Ex. No. | Epoxide, Grams | Amine, Grams | Equivalent Ratio [1] | Barcol Hardness | Heat Distortion Point, °C. |
|---|---|---|---|---|---|
| 5 | 27.4 | 7.6 | 0.75 | 54 | 147 |
| 6 | 25.6 | 9.4 | 1.0 | 52 | 170 |
| 7 | 24.0 | 11.0 | 1.25 | 48 | 160 |

[1] Expressed as equivalents of amino-hydrogen groups per epoxy group.

EXAMPLES 8 THROUGH 10

A quantity of 3,9-bis(1,2-epoxy-1-methylethyl)spirobi-(meta-dioxane) (1.3 grams) and an amine hardener [1] were mixed in various proportions as indicated in Table II. The mixtures were heated until they were homogeneous, then they where maintained at a temperature of 80° C. for four hours during which time gels were formed. The resulting gels were postcured for two hours at a temperature of 120° C. plus six hours at a temperature of 160° C. The resulting resins are described in Table III.

Table III

| Ex. No. | Amine,[1] Grams | Equivalent Ratio [2] | Gel Time at 80° C., Minutes | Resin Description |
|---|---|---|---|---|
| 8 | 0.45 | 1.0 | 131 | Yellow, tough, Barcol, 42. |
| 9 | 0.56 | 1.25 | 101 | Yellow, tough, Barcol, 40. |
| 10 | 0.69 | 1.5 | 65 | Pale amber, tough, Barcol, 38. |

[1] Adduct of one mole of diethylenetriamine with two moles of acrylonitrile
$NC(CH_2)_2$—NH—$(CH_2)_2$—NH—$(CH_2)_2$—NH—$(CH_2)_2$—CN

[2] Expressed as amino-hydrogen groups per epoxy group.

EXAMPLES 11 THROUGH 15

Quantities of 3,9-bis(1,2-epoxypropyl)spirobi(meta-dioxane) and diethylenetriamine or a commercial amine hardener [2] were mixed in the proportions indicated in

[1] Adduct of one mole of diethylenetriamine with two moles of acrylonitrile
$NC(CH_2)_2$—NH—$(CH_2)_2$—NH—$(CH_2)_2$—NH—$(CH_2)_2$—CN

[2] Adduct of four moles of diethylenetriamine with one mole of the diglycidyl ether of bisphenol A [2,2-p-hydroxyphenyl)-propane].

Table IV. The resulting mixtures were heated until homogeneous, then they were maintained at a temperature of 80° C. or 120° C. for from two to four hours during which time gels were formed. The corresponding amber colored resins obtained after a postcure at a temperature of 160° C. are described in Table IV.

in Table VI. The mixtures were heated until homogeneous and they were maintained at a temperature of 120° C. for from five to thirty-two hours during which time gelling usually occurred. The resulting resins were postcured for six hours at a temperature of 160° C. and then examined at room temperature.

*Table IV*

| Ex. No. | Epoxide, Grams | Amine | Grams | Equivalent Ratio [2] | Gel Time, Hours | Cure, Hours, ° C. | Resin Description |
|---|---|---|---|---|---|---|---|
| 11 | 1.36 | DETA [3] | 0.16 | 0.75 | 4.45 at 80° C | 5, 80; 2, 120 | Tough, Barcol, 51. |
| 12 | 1.36 | DETA | 0.22 | 1.0 | 4.1 at 80° C | 5, 80; 2, 120 | Tough, Barcol, 46. |
| 13 | 1.36 | DETA | 0.27 | 1.25 | 3.75 at 80° C | 5, 80; 2, 120 | Tough, Barcol, 50. |
| 14 | 1.36 | DETA | 0.32 | 1.5 | 3.6 at 80° C | 5, 80; 2, 120 | Tough, Barcol, 49. |
| 15 | 6.8 | Commercial Hardener.[1] | 2.5 | 1.0 | 0.47 at 120° C | 3, 120 | Tough, Barcol, 47. |

[1] Adduct of four moles of diethylenetriamine with on mole of the diglycidyl ether of bisphenol A [2,2-(p-hydroxyphenyl)propane].
[2] Expressed as amino-hydrogen groups per epoxy group.
[3] Diethylenetriamine.

EXAMPLE 16

A quantity of 3,9-bis(1,2-epoxypropyl)spirobi(meta-dioxane) (25.4 grams) and p,p'-methylenedianiline (9.4 grams) were mixed in the proportion of one amino-hydrogen group per epoxy group. The resulting mixture was heated until homogeneous and it was maintained at a temperature of 120° C. for three hours and then for six hours at a temperature of 160° C. A gel was observed after one and one-half hours at a temperature of 120° C. The resulting amber-colored resin was hard and somewhat brittle.

EXAMPLES 17 AND 18

A quantity of 3,9-bis(1,2-epoxypropyl)spirobi(meta-dioxane) (7.3 grams) and p,p'-methylenedianiline (2.7 grams) were mixed in the proportion of one amino-hydrogen group per epoxy group. Two such mixtures were prepared and to the mixture in Example 17 there was added 0.3 gram of boron trifluoride-piperidine complex (3.0 weight percent based on the total weight of epoxide and amine) and to the mixture of Example 18 there was added 0.5 gram of bisphenol A [2,2-(p-hydroxyphenyl)-propane]. Both mixtures were heated until homogeneous and gel time was observed at a temperature of 120° C.

*Table V*

| Ex. No. | Gel Time at 120° C. | Cure, Hours, ° C. |
|---|---|---|
| 17 | 15 minutes | 5,120; 6,160 |
| 18 | 30 minutes | 1,120; 6,160 |
| Control [1] | 1.5 hours | 3,120; 6,160 |

[1] See Example 16.

*Table VI*

| Ex. No. | Amine, Grams | Equivalent Ratio [1] | Gel Time at 120° C., Hours | Cure at 120° C., Hours | Resin Description at Room Temperature |
|---|---|---|---|---|---|
| 19 | 0.10 | 0.2 | No gel | 32 | Yellow, hard, brittle. |
| 20 | 0.15 | 0.3 | No gel | 32 | Do. |
| 21 | 0.20 | 0.4 | 2.37 | 5 | Do. |
| 22 | 0.25 | 0.5 | 1.8 | 5 | Do. |
| 23 | 0.40 | 0.8 | <1.0 | 5 | Pale amber, tough, Barcol, 38. |
| 24 | 0.50 | 1.0 | <1.0 | 5 | Pale amber, tough, Barcol, 40. |
| 25 | 0.75 | 1.5 | <1.0 | 5 | Amber, tough, Barcol, 35. |
| 26 | 1.0 | 2.0 | <1.0 | 5 | Amber, hard, brittle. |
| 27 | 1.25 | 2.5 | <1.0 | 5 | Do. |
| 28 | 1.5 | 3.0 | 1.0 | 5 | Do. |
| 29 | 1.75 | 3.5 | 5.0 | 13 | Do. |
| 30 | 2.0 | 4.0 | No gel | 32 | Do. |

[1] Expressed as equivalents of amino-hydrogen groups per epoxy group

EXAMPLES 31 THROUGH 37

Quantities of 3,9-bis(1,2-epoxy-1-methylethyl)spirobi-(meta-dioxane) (1.36 grams respectively) were mixed with various polyamines in the proportion of one amino-hydrogen group per epoxy group. The resulting mixtures were heated until homogeneous, then they were maintained at a temperature of 80° C. or 120° C. until gels were formed as indicated in Table VII. All resins were postcured for six hours at a temperature of 160° C. and examined at room temperature.

*Table VII*

| Ex. No. | Amine Hardener | Grams | Gel Time, Minutes | Gel Temperature, ° C. | Cure, Hours, ° C. | Resin Description |
|---|---|---|---|---|---|---|
| 31 | Ethylene-diamine | 0.15 | Immediately | 80 | 4.75, 80; 1.5, 120 | Opaque, hard, tough. |
| 32 | 1,6-Hexane-diamine | 0.29 | 5 | 80 | 4.75, 80; 1.5, 120 | Opaque, tough, Barcol, 27. |
| 33 | Diethylene-triamine | 0.22 | 1 | 80 | 4.75, 80; 1.5, 120 | Yellow, tough, Barcol, 20. |
| 34 | Xylylene-diamine | 0.34 | Immediately | 80 | 4.75, 80; 1.5, 120 | Pale yellow, tough, Barcol, 12. |
| 35 | p-Phenylene-diamine | 0.27 | 5 | 120 | 6, 120 | Black, touch, Barcol, 45. |
| 36 | "Polyamide 115" [1] | 1.82 | 4 hours at 80° C. plus 15 minutes at 120° C. | | 4, 80; 2.5, 120 | Pale brown, opaque, tough, Barcol, 0. |
| 37 | Aniline | 0.47 | | 120 | 6, 120 | Amber, hard, brittle. |

[1] Condensation product of an unsaturated fatty acid such as dilinoleic acid with an aliphatic amine such as ethylene diamine; molecular weigh range 3,000 to 10,000.

EXAMPLES 19 THROUGH 30

Quantities of 3,9-bis(1,2-epoxy-1-methylethyl)-spirobi-(meta-dioxane) (1.36 grams per sample) were mixed with p,p'-methylenedianiline in the proportions indicated

EXAMPLES 38 THROUGH 40

Quantities of 3,9-bis(1,2-epoxypropyl)spirobi(meta-dioxane) and an amine hardener [3] were mixed in various proportions as indicated in Table VIII. The mixtures were heated until homogeneous, then they were maintained at a temperature from 100° C. to 120° C. for from one-half hour to three hours during which time gels were formed. All resins were postcured for six hours at a temperature of 160° C. and had the corresponding physical properties listed in Table IX.

Table VIII

| Ex. No. | Epoxide, Grams | Amine,[1] Grams | Equivalent Ratio [2] | Gel Time and Temperature, Minutes, °C. | Cure Hours, °C. |
|---|---|---|---|---|---|
| 38 | 27.4 | 7.6 | 0.75 | 20, 120 | 3, 120 |
| 39 | 25.6 | 9.4 | 1.0 | 10, 120 | 3, 120 |
| 40 | 24.0 | 11.0 | 1.25 | 17, 100 | 0.5, 100 |
| | | | | | 1.5, 120 |

[1] Adduct of four moles of diethylenetriamine with one mole of the diglycidyl ether of bisphenol A [2,2-(p-hydroxyphenyl)-propane].
[2] Expressed as equivalents of amino-hydrogen groups per epoxy group.

Table IX

| Ex. No. | Barcol Hardness | Heat Distortion Point, °C. | Izod Impact |
|---|---|---|---|
| 38 | 50 | 139 | 0.3 |
| 39 | 50 | 146 | 0.4 |
| 40 | 49 | 129 | 0.4 |

EXAMPLES 41 THROUGH 50

Quantities of 3,9-bis(1,2-epoxypropyl)spirobi(meta-dioxane) (1.36 grams respectively) were mixed with various polyamines in the proportion of one amino-hydrogen group per epoxy group as indicated in Table X. The mixtures were heated until homogeneous, then they were maintained at a temperature from 80° C. to 120° C. during which time gels were formed. All the resins were postcured for six hours at a temperature of 160° C. and had the corresponding resin description listed in Table X.

The following alphabetic designations are used to identify the epoxides in Table XI.

A—3,9-bis(3,4-epoxybutyl)spirobi(meta-dioxane)
B—3,9-bis(1,2-epoxy-1-ethylpentyl)spirobi(meta dioxane)
C—3,9-bis(3,4-epoxycyclohexyl)spirobi(metal-dioxane)
D—3,9-bis(1,2-epoxyethyl)spirobi(meta-dioxane).

Table XI

| Ex. No. | Epoxide, Grams | Amine, Grams | Equivalent Ratio [1] | Gel Time at 120 °C., Minutes | Cure at 120 °C., Hours | Resin Description |
|---|---|---|---|---|---|---|
| 51 | A, 3.94 | 1.0 | 1.0 | 120 | 7 | Yellow, tough, Barcol, 47. |
| 52 | B, 6.17 | 1.25 | 1.25 | No gel | 30 | Amber, hard, brittle. |
| 53 | C, 5.03 | 1.25 | 1.25 | 30 | 7 | Do. |
| 54 | D, 3.80 | 1.0 | 1.0 | 3 | 7 | Yellow, hard, brittle. |

[1] Expressed as equivalents of amino-hydrogen groups per epoxy group.

EXAMPLE 55

A quantity of 3,9 - bis(1,2 - epoxy - 1 - methylethyl)-spirobi(meta-dioxane) (10 grams) and p,p'-methylenedianiline (2 grams) were separately pulverized in a mortar and the two were then thoroughly mixed. The amine was present in a proportion so as to provide one amino-hydrogen group per one epoxy group. A portion (about 3 grams) of this mixture was placed in an aluminum container and heated to a temperature of 160° C. at which time a mobile liquid melt was formed. After heating at this temperature for forty minutes a gel was formed. The resulting gel was postcured for eight hours at a temperature of 160° C. and there was obtained a pale yellow resin with a Barcol hardness of 48. The above molding powder composition gave similar results after storing at room temperature for three months.

What is claimed is:

1. A curable composition comprising 3,9-bis(1,2-epoxy- 1 - methylethyl)spirobi(meta - dioxane) and a polyfunctional amine containing at least two active amino hydrogen atoms and selected from the group consisting of methylenedianiline, diethylenetriamine, xylylenediamine, ethylenediamine and hexanediamine.

2. A curable composition comprising 3,9-bis(1,2-epoxy-1-methylethyl)spirobi(meta-dioxane) and methylenedianiline.

3. A curable composition comprising 3,9-bis(1,2-epoxy-1-methylethyl)spirobi(meta-dioxane) and diethylenetriamine.

4. A curable composition comprising 3,9-bis(1,2-epoxy-

Table X

| Ex. No. | Amine Hardener | Grams | Gel Time and Temperature, Hours, °C. | Cure, Hours, °C. | Resin Description |
|---|---|---|---|---|---|
| 41 | Ethylenediamine | 0.15 | 3.5, 80; 2.5, 120 | 3.5, 80; 10, 120 | Amber, tough, Barcol, 45. |
| 42 | 1,6-Hexanediamine | 0.29 | 3.5, 80; 2.5, 120 | 3.5, 80; 10, 120 | Amber, tough, hard. |
| 43 | Diethylenetriamine | 0.22 | 1.8, 80 | 3, 80; 1.5, 120 | Amber, tough, Barcol, 40. |
| 44 | Xylylenediamine | 0.34 | 3, 80; 2.5, 120 | 3, 80; 10, 120 | Pale yellow, tough, Barcol, 30. |
| 45 | p-Phenylenediamine | 0.27 | 0.17, 120 | 5, 120 | Black, tough, Barcol, 40. |
| 46 | "Polyamide 115"[1] | 1.82 | 4, 80; 1.25, 120 | 4, 80; 2.5, 120 | Amber, tough, Barcol, 0. |
| 47 | Aniline | 0.47 | No gel | 37, 120 | Amber, hard, brittle. |
| 48 | 2-Ethylhexylamine | 0.65 | No gel | 37, 120 | Yellow, hard, brittle. |
| 49 | Commercial Hardener [2] | 0.45 | 10,120 | 13, 120 | Amber, tough, Barcol, 35. |
| 50 | do [3] | 0.37 | 2.5, 80 | 5.5, 80; 1, 120 | Amber, tough, Barcol, 44. |

[1] Condensation product of a fatty acid and an amine (see Table VII for description).
[2] Adduct of one mole of diethylenetriamine and two moles of acrylonitrile.
[3] Adduct of one mole of ethylene oxide and one mole of diethylenetriamine.

EXAMPLES 51 THROUGH 54

Various spirobi(meta-dioxane) diepoxides and p,p'-methylenedianiline were mixed in the proportions indicated in Table XI. Mixtures were heated until homogeneous and they were maintained at a temperature of 120° C. until gelling occurred, then they were postcured for six hours at a temperature of 160° C. The resulting resins were examined at room temperature.

1 - methylethyl)spirobi(meta - dioxane) and xylylenediamine.

5. A curable composition comprising 3,9-bis(1,2-epoxy-1 - methylethyl)spirobi(meta - dioxane) and ethylenediamine.

6. A curable composition comprising 3,9-bis(1,2-epoxy-1-methylethyl)spirobi(meta-dioxane) and hexanediamine.

7. A composition which is curable to a solid resin, said composition comprising 3,9-bis(1,2-epoxy-1-methylethyl)spirobi(meta-dioxane) and p,p'-methylenedianiline in proportions containing from 0.3 to 4.0 amino hydrogen atoms of the amine for each epoxide group of 3,9-bis(1,2-epoxy-1-methylethyl)spirobi(meta-dioxane).

8. A composition which is curable to a hard, tough resin, said composition comprising 3,9-bis(1,2-epoxy-1-methylethyl)spirobi(meta-dioxane) and p,p'-methylenedianiline in proportions containing from 0.4 to 2.0 amino hydrogen atoms of the amine for each epoxide group of 3,9-bis(1,2-epoxy-1-methylethyl)spirobi(meta-dioxane).

9. A composition which is curable to a solid resin, said composition comprising 3,9-bis(1,2-epoxy-1-methylethyl)spirobi(meta-dioxane) and ethylenediamine in proportions containing from 0.3 to 4.0 amino hydrogen atoms of the amine for each epoxide group of 3,9-bis-(1,2-epoxy-1-methylethyl)spirobi(meta-dioxane).

10. A composition which is curable to a hard, tough resin, said composition comprising 3,9-bis(1,2-epoxy-1-methylethyl)spirobi(meta-dioxane) and ethylenediamine in proportions containing from 0.4 to 2.0 amino hydrogen atoms of the amine for each epoxide group of 3,9-bis(1,2-epoxy-1-methylethyl)spirobi(meta-dioxane).

11. A composition which is curable to a solid resin, said composition comprising 3,9-bis(1,2-epoxy-1-methylethyl)spirobi(meta-dioxane) and 1,6-hexanediamine in proportions containing from 0.3 to 4.0 amino hydrogen atoms of the amine for each epoxide group of 3,9-bis(1,2-epoxy-1-methylethyl)spirobi(meta-dioxane).

12. A composition which is curable to a hard, tough resin, said composition comprising 3,9-bis(1,2-epoxy-1-methylethyl)spirobi(meta-dioxane) and 1,6-hexanediamine in proportions containing from 0.4 to 2.0 amino hydrogen atoms of the amine for each epoxide group of 3,9-bis(1,2-epoxy-1-methylethyl)spirobi(meta-dioxane).

13. A composition which is curable to a solid resin, said composition comprising 3,9-bis(1,2-epoxy-1-methylethyl)spirobi(meta-dioxane) and diethylenetriamine in proportions containing from 0.3 to 4.0 amino hydrogen atoms of the amine for each epoxide group of 3,9-bis(1,2-epoxy-1-methylethyl)spirobi(meta-dioxane).

14. A composition which is curable to a hard, tough resin, said composition comprising 3,9-bis(1,2-epoxy-1-methylethyl)spirobi(meta-dioxane) and diethylenetriamine in proportions containing from 0.4 to 2.0 amino hydrogen atoms of the amine for each epoxide group of 3,9-bis(1,2-epoxy-1-methylethyl)spirobi(meta-dioxane).

15. A composition which is curable in a solid resin, said composition comprising 3,9-bis(1,2-epoxy-1-methylethyl)spirobi(meta-dioxane) and xylylenediamine in proportions containing from 0.3 to 4.0 amino hydrogen atoms of the amine for each epoxide group of 3,9-bis-(1,2-epoxy-1-methylethyl)spirobi(meta-dioxane).

16. A composition which is curable to a hard, tough resin, said composition comprising 3,9-bis(1,2-epoxy-1-methylethyl)spirobi(meta-dioxane) and xylylenediamine in proportions containing from 0.4 to 2.0 amino hydrogen atoms of the amine for each epoxide group of 3,9-bis(1,2-epoxy-1-methylethyl)spirobi(meta-dioxane).

17. The composition as claimed in claim 1 and cured at a temperature between 25° C. and 250° C.

18. The composition as claimed in claim 1 and cured to a solid resin at a temperature between 50° C. and 200° C.

19. A resin comprising a polymerized mixture of claim 1.

20. A resin comprising a polymerized mixture of claim 2.

21. A resin comprising a polymerized mixture of claim 3.

22. A resin comprising a polymerized mixture of claim 4.

23. A resin comprising a polymerized mixture of claim 5.

24. A resin comprising a polymerized mixture of claim 6.

25. A resin comprising a polymerized mixture of claim 7.

26. A resin comprising a polymerized mixture of claim 8.

27. A resin comprising a polymerized mixture of claim 9.

References Cited in the file of this patent

UNITED STATES PATENTS 2,895,962    Fischer _____ July 21, 1959

OTHER REFERENCES

Berlow et al.: "The Pentaerythritol," Reinhold Pub. Co., New York, 1958, pages 141–178.